United States Patent [19]

Glover et al.

[11] Patent Number: 4,686,949

[45] Date of Patent: Aug. 18, 1987

[54] SPARK IGNITED INTERNAL COMBUSTION ENGINES

[75] Inventors: Anthony R. Glover, Brighton; David W. Grigg, East Preston, both of England

[73] Assignee: Ricardo Consulting Engineers Plc., England

[21] Appl. No.: 695,172

[22] Filed: Jan. 25, 1985

[30] Foreign Application Priority Data

Jan. 25, 1984 [GB] United Kingdom ............... 8401928

[51] Int. Cl.⁴ ............................................. F02B 23/08
[52] U.S. Cl. .................................... 123/306; 123/661
[58] Field of Search ................... 123/306, 661, 193 H, 123/309

[56] References Cited

U.S. PATENT DOCUMENTS

| | | | |
|---|---|---|---|
| 4,121,544 | 10/1978 | May .................................... | 123/263 |
| 4,291,655 | 9/1981 | Yamakawa .......................... | 123/306 |
| 4,359,981 | 11/1982 | Kanda et al. ........................ | 123/263 |
| 4,480,625 | 11/1984 | Kanda et al. ........................ | 123/661 |

FOREIGN PATENT DOCUMENTS

| | | |
|---|---|---|
| 0097409 | 4/1984 | European Pat. Off. . |
| 1526338 | 2/1970 | Fed. Rep. of Germany ...... 123/661 |
| 3138328 | 4/1983 | Fed. Rep. of Germany . |
| 2317491 | 7/1976 | France . |
| 57-165627 | 10/1982 | Japan ................................. 123/661 |
| WO82/0292 | 4/1982 | PCT Int'l Appl. . |
| 609832 | 10/1948 | United Kingdom . |
| 833684 | 4/1960 | United Kingdom . |
| 891738 | 3/1962 | United Kingdom . |
| 2019936A | 11/1979 | United Kingdom . |

Primary Examiner—Andrew M. Dolinar
Attorney, Agent, or Firm—Price, Heneveld, Cooper, DeWitt & Litton

[57] ABSTRACT

A spark ignited internal combustion engine includes a cylinder block defining a cylinder which accommodates a piston and is closed by a cylinder head. One of the opposed surfaces of the piston and cylinder head affords a recess constituting a combustion chamber. The outer edge of the recess is defined, when viewed in plan, by two arcs, the radius of curvature of each arc being less at one end than at the other, the decrease in the radius of curvature being in the same sense in the two arcs. In use, when the piston is performing its compression stroke at least two swirl patterns are produced in the inlet charge of air and fuel in separate portions of the combustion chamber in the same sense about respective axes parallel to the axis of the cylinder.

16 Claims, 11 Drawing Figures

SPARK IGNITED INTERNAL COMBUSTION ENGINES

The present invention relates to spark ignited internal combustion engines and is concerned with the configuration of the combustion chamber of the or each cylinder of such an engine of single or multi-cylinder type.

Modern demands for high engine output combined with low part-load fuel consumption and low exhaust gas emissions set difficult problems for engine designers. Whilst much has been done to reduce engine friction and other parasitic losses, thereby improving the brake performance of engines, improvements are still being sought, particularly in combustion efficiency in conjunction with a further reduction in exhaust gas emissions of carbon monoxide, nitrogen oxides (NOx) and unburnt hydrocarbons.

As is well known from both theoretical considerations and practical observation, cycle and combustion efficiency improves as the compression ratio is raised and the rate of burning increased to approximate to that assumed for constant volume combustion. Assuming the use of the weakest mixture for maximum power and wide open throttle, i.e. full load operation, the compression ratio that can be used with a given quality of fuel is limited by knock and the rate of pressure rise, which is influenced by the details of the combustion chamber configuration and the motion of the air and fuel charge in the combustion chamber. In practice, the compression ratio and rate of pressure rise may have to be restricted to avoid excessive noise emission and high maximum combustion pressures. Improvements in engine rigidity and techniques to reduce the noise radiated from the exterior surfaces of engines now permit the use of higher rates of pressure rise than were conventional some years ago.

One approach to reduce the level of noxious exhaust production is to use weaker mixture strengths. Starting with the weakest mixture for maximum power, it is found that the carbon monoxide present in the exhaust progressively falls to a relatively low value and then remains at that value as the mixture is further weakened. The quantity of unburnt hydrocarbons is reduced as the mixture is weakened but tends to rise again as the limit for regular combustion is approached. In the case of nitrogen oxides (NOx), these are rapidly formed during the high temperature portion of the combustion and then remain as very stable compounds. Using the term equivalence ratio to express the ratio of the stoichiometric air/fuel ratio to the actual prevailing air/fuel ratio, i.e. equivalence ratios less than unity mean that the mixture strength in use is weak, the amount of NOx rises to a maximum as the equivalence ratio falls to about 0.9, i.e. 10% weak, and then progressively falls as the equivalence ratio reduces to the limit of regular combustion. As the mixture strength is weakened from its maximum power setting the brake specific fuel consumption falls to reach its minimum value, usually at an equivalence ratio of about 0.8.

It is found that for much of its life an automotive engine operates at only a small fraction of its maximum power output. A high proportion of its running time is at the lower end of its speed range and at part throttle operation. The increased pumping losses at part throttle operation result in an increased specific fuel consumption. In each cycle the residual exhaust gases from the previous cycle form a greater volumetric proportion of the fresh charge and thus combustion tends to be slower and the cycle temperatures lower. As a result NOx emissions are lower than at full throttle.

Recent experience indicates that careful adjustment of the motion of the air and fuel charge in the cylinder can lead to improvements in the part-load fuel economy, the lean burning limit and exhaust emissions. A turbulent air motion during the flame initiation and burn periods is desirable. If turbulence is generated during the intake stroke this tends to decay during the compression stroke. Conversely, turbulence generated by "squish", that is to say displacement of that part of the charge which is between flat portions of the piston and head closely approaching one another at the end of the compression stroke, comes too late to affect the early stages of combustion.

It is an object of the present invention to provide a spark-ignited internal combustion engine whose combustion chamber is so configured that swirl of the air and fuel charge is produced and then terminated at the appropriate times to produce intense turbulence thereby improving combustion under part load conditions.

According to the present invention a spark ignited internal combustion engine includes a cylinder block defining a cylinder which accommodates a piston and is closed by a cylinder head, opposed surfaces of the piston and the cylinder head together defining the combustion chamber, the combustion chamber being so shaped that when the piston is performing its compression stroke at least two swirl patterns are produced in the inlet charge of air and fuel in separate portions of the combustion chamber in the same sense substantially about respective axes parallel to the axis of the cylinder. The combustion chamber is preferably constituted by a recess in one of the said surfaces, the outer edge of which recess is defined, when viewed in plan, by two arcs, the radius of curvature of each arc being less at one end than at the other, the decrease in the radius of curvature being in the same sense in the two arcs.

It will be appreciated that the swirl patterns referred to above need not be, and in practice are unlikely to be, homogeneous uniform rotating masses of air and fuel but instead are likely to be areas of intense and largely random turbulence on which a general rotation is superimposed and the term swirl pattern is to be interpreted accordingly. The precise manner in which the air and fuel mixture, which is generally caused to swirl during the inlet stroke, is caused to break up into two or more swirl patterns and indeed the precise pattern of movement within these swirl patterns are not fully understood. Thus whilst reference is made herein for the sake of convenience to "swirl" and "swirl patterns", the shape of the combustion chamber may simply be thought of as resulting in at least two distinct air patterns or motions which impinge upon and ultimately destroy one another.

Thus in the engine in accordance with the present invention the combustion chamber constitutes a recess which may be considered as being constituted by two communicating helical grooves, the depth of which increases along part of the length of each groove in the same sense. Thus swirl generated during the inlet stroke and retained during the compression stroke is modified towards the end of compression stroke by virtue of the shape of the combustion chamber. This produces a high level of turbulence at the correct time in the engine cycle to promote fast combustion and minimise the production of noxious exhaust products.

The compression ratio of the engine in accordance with the present invention is preferably between 7.0 and 11.0:1 which results in lower frictional losses than for so-called high ratio compact chamber (HRCC) engines. It has been established experimentally that engines with a lower compression ratio but a high degree of induced motion of the inlet charge of air and fuel can equal the part-load economy of HRCC engines and operate at full load on fuel of a lower quality.

According to a further aspect of the present invention a spark ignited internal combustion engine includes a cylinder block defining a cylinder which accommodates a piston and is closed by a cylinder head, one of the opposed surfaces of the piston and cylinder head affording a recess constituting a combustion chamber, the outer edge of which recess is defined, when viewed in plan, by two arcs, the radius of curvature of each arc being less at one end than at the other, the decrease in the radius of curvature being in the same sense in the two arcs.

In the preferred embodiment the depth of the recess adjacent the two arcs increases progressively in the sense in which the radius of curvature of the arcs decreases at least over a part of their length, preferably over one-third to one-half of the length of each arc starting at the end at which the radius of curvature is largest. It will be appreciated that it is primarily the progressive increase in depth in the same sense of the recess adjacent the two arcs which results in the production of the two swirl patterns as the piston approaches the end of its compression stroke.

The depth of the recess adjacent each arc preferably progressively increases in the radially inward direction over substantially one-third to one-half of the length of each arc starting at the end at which the radius of curvature is largest. It will be appreciated that the increase in depth of the recess adjacent the first third of each arc in both the circumferential and radially inward directions results in the inlet charge initially receiving both a circumferential component of velocity and also a radial component of velocity.

Starting at the ends at which the radius of curvature of the arcs is largest, it is preferred that each arc has a radius of curvature which is substantially equal to the radius of the piston for the first 90° and thereafter progressively decreases. Each arc preferably encloses an area less than one half of the plan area of the piston and turns through an angle in excess of 180°. It is also preferred that that portion of each arc whose radius of curvature is substantially equal to that of the piston is substantially in registry with the wall of the cylinder. It will be appreciated that this will mean that in the preferred embodiment in which the combustion chamber is formed in the cylinder head the piston will very closely approach two planar portions of the cylinder head at the end of the compression stroke. This will produce a squish effect which influences the turbulence of the inlet charge at the end of the compression stroke.

Preferably the side wall of the recess extends initially away from the plane on which the cylinder head engages the cylinder block substantially perpendicular thereto and then merges into the floor of the recess, the height of the said side wall increasing progressively over at least part of the length of each arc, preferably over substantially one-third of the length of the arcs, starting at the end at which the radius of curvature is largest. The radius of curvature with which the side wall merges with the floor of the recess preferably increases progressively along the length of each arc in the direction in which the radius of curvature of the arc decreases over substantially the last third of the length thereof. Thus the two grooves by which the combustion chamber may be considered to be constituted are of generally spiral or helical shape and have floors which are also helical over part of their length in a different sense.

The combustion chamber may be formed in the piston crown but, as mentioned above, it is preferred that it is formed in the cylinder head. In the preferred embodiment there is a single inlet port and a single exhaust port provided in the cylinder head and it will be appreciated that each arc extends around the outer portion of a respective port.

It is preferred that the inlet port is arranged to produce swirl of the inlet charge of fuel and air during the inlet stroke of the piston and for this purpose the inlet port may be of either of the known "directed" and "helical" types. A directed inlet port is one which is so directed that the air enters the cylinder tangentially at as large a radius of action as possible and at a shallow angle so that a shallow spiral rotation of the air charge forms in the cylinder. A helical inlet port is one which is provided with a vortex chamber immediately behind the rear of the inlet valve so that the incoming air rotates within the vortex chamber about the valve axis as it moves towards the combustion space. In such an arrangement, the air moves in a helical path within the port and issues from the port into the cylinder at a significant radius from the cylinder axis so that a substantial tangential air velocity is created within the cylinder causing swirl about the cylinder axis on which is superimposed the vortex motion created by the vortex chamber. It is preferred that the swirl ratio is within the range 0.5 to 3. Swirl ratio is the ratio of the angular velocity of the swirling charge of air and fuel in the cylinder at the end of the suction stroke to the angular velocity of the engine crankshaft.

Further features and details of the present invention will be apparent from the following description of one specific embodiment which is given by way of example only with reference to the accompanying drawings, in which.

Figures 1, 3:
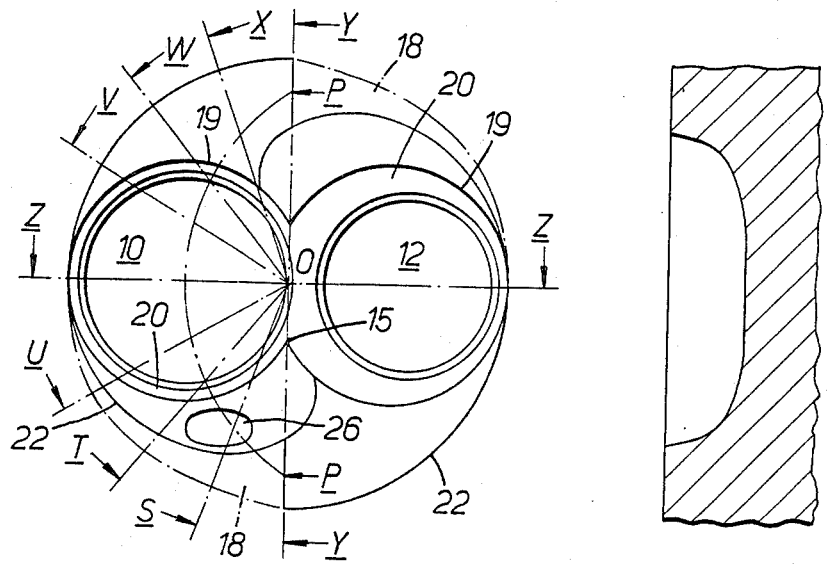
FIG. 1 is an underplan view of a combustion chamber formed in the cylinder head of a single or multi-cylinder automotive engine.
FIG. 3 is a scrap vertical section on the line Y—Y in FIG. 1.
Figure 2:
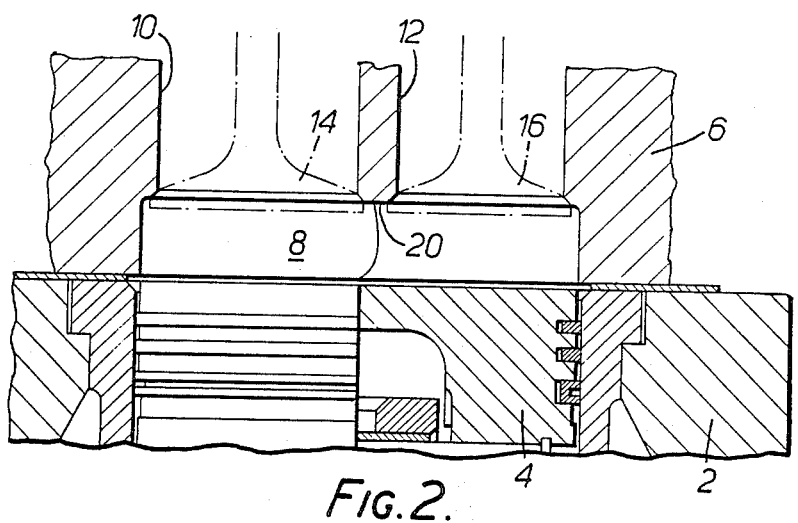
FIG. 2 is a vertical section on the line Z—Z in FIG. 1, i.e. along the crankshaft axis, showing part of the cylinder head and of the cylinder block and a single piston.

The engine includes a cylinder block 2 defining a cylinder which, in the conventional manner, accommodates a piston 4 and is closed by a cylinder head 6. In the cylinder head 6 a recess constituting a combustion chamber 8 is formed in the roof of which a single inlet port 10 and a single exhaust port 12 are formed. The inlet and exhaust ports are controlled by conventional poppet valves 14 and 16 respectively which are operated by a single direct acting overhead camshaft (not shown).

The areas of the combustion chamber roof around each of the exhaust and inlet valves are substantially planar, each such area being defined by the ports themselves and by a respective arc 19 whose radius is 0.25 to 0.35 and in this case 0.3 times the cylinder bore diameter and whose centre is so positioned that part of the arc is coincident with the periphery of the cylinder bore when the cylinder head is attached to the block. By virtue of the fact that the inlet port has a larger diameter than that of the exhaust port and the two ports are not symmetrically disposed with respect to the periphery of the cylinder bore the planar areas, which are designated 20, around the two ports are of course of differing area. The remainder of the combustion chamber may be considered to be constituted by two communicating spiral grooves, each of which extends around rather more than half of the periphery of a respective port and begins at the vertical centre line Y—Y as seen in FIG. 1 and terminates at a respective one of the cusps 15 of the intersecting circles 19.

Figure 4:
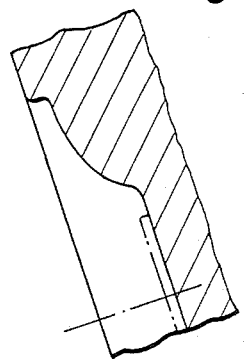
FIGS. 4 to 9 are scrap vertical sections on the lines O-X, O-W, O-V, O-U, O-T and O-S respectively.
Figure 7:
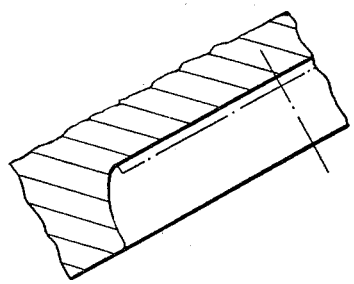
Figure 5:
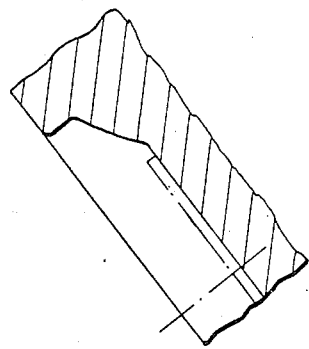
Figure 8:
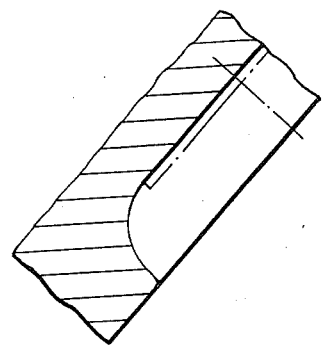
Figure 6:
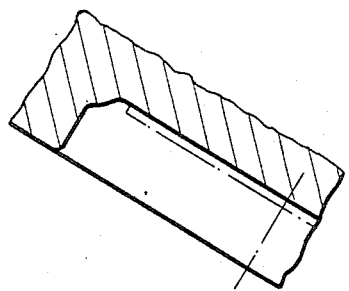
Figure 9:
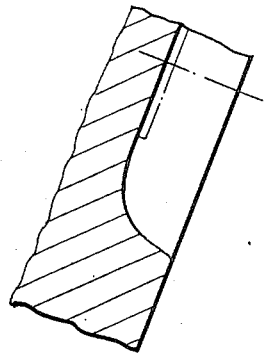
Figure 10:
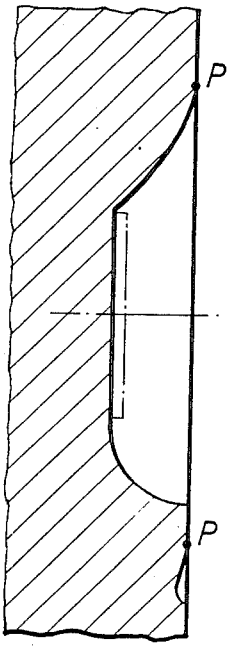
FIG. 10 is a scrap vertical section in the radial direction on the arc p—p in FIG. 1.

The shape of the combustion chamber may thus be considered as constituting two halves which are rotationally symmetrical about the vertical centre line as seen in FIG. 1. The outer edge of each wall of the combustion chamber around each port is defined, as seen in underplan, by a respective arc or spiral 22 whose radius of curvature for about 90° starting from one end is the same as the radius of the cylinder bore and then progressively decreases to the other end where it merges with the arc 19 defining the planar area around the other port. Considering now the left hand half of the combustion chamber as seen in FIG. 1, this begins at the vertical centre line Y—Y at the top of the Figure and its depth adjacent the associated arc 22 progressively increases for between 60° and 90°, in this case about 80°, over the length of the said arc from an initial value of zero to the depth of the planar area 20. The depth of the recess also increases radially inwardly over the same circumferential extent to a depth equal to that of the planar area 20, the roof of the recess in this region of radial increase in depth being of convex shape, as best seen in FIG. 4. The recess thus has a substantially vertical outer wall which is defined by an arc 22 and whose height progressively increases for about the first 80° and which blends into the roof of the recess. Between about 80° and 100° from the beginning of the arc the vertical side wall of the recess is of maximum height and merges directly into the planar area 20. Thereafter the radius of curvature with which the side wall merges with the planar area 20 progressively increases with the result that the height of the vertical portion of the side wall of the recess progressively decreases. The complex manner in which the shape of the recess progressively changes will be apparent from FIGS. 2 to 10.

By virtue of the fact that each half of the combustion chamber has a plan area slightly less than half that of the cylinder bore, the cylinder head affords two plane areas 18 which are approached very closely by the piston crown at the end of the compression stroke. When this occurs a proportion of the inlet charge is suddenly displaced laterally into the combustion chamber by virtue of the "squish" effect which produces a sudden substantially random tubulence in the combustion chamber.

Figure 11:
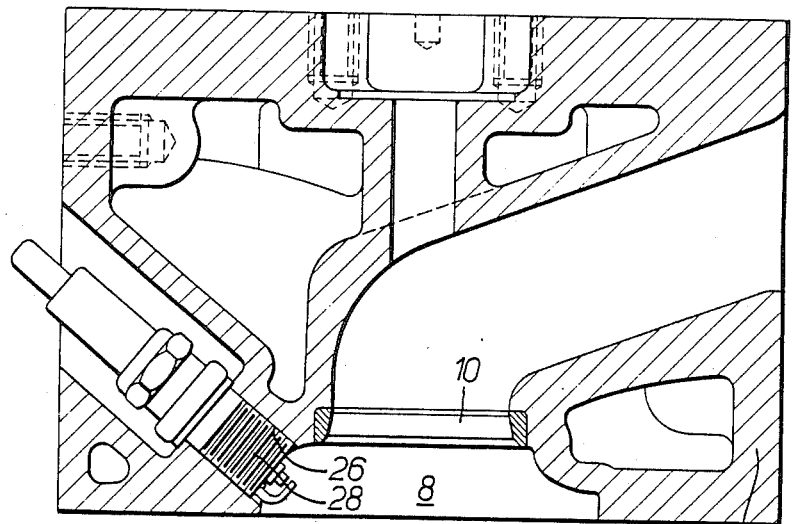
FIG. 11 is a vertical section through the cylinder head from which the inlet valve has been removed for the sake of clarity.

At the deeper portion of one-half of the recess, that is to say adjacent that portion of one arc which is of minimum radius of curvature, there is a tapped hole 26 for the reception of a spark plug 28 (shown only in FIG. 11). Alternatively two spark plugs may be provided in mirror symmetrical positions.

As referred to above, the inlet port is preferably of directed or helical type and in this case is of directed type. Thus, in use, swirl is induced in the inlet charge of air and fuel during the inlet stroke. As the piston approaches the top dead centre position the swirl pattern is altered by the combustion chamber configuration. Thus the increase in depth of the combustion chamber adjacent the initial portion of each arc 22 both along its length and radially inwards results in a separate swirl pattern being produced in each half of the combustion chamber. Each air pattern is in the same sense, that is to say anti-clockwise as seen in FIG. 1. As the compression stroke terminates, swirl is no longer actively induced and thus rapidly ceases both by virtue of the impingement of the two air motion patterns in the central region of the combustion chamber, at which region the air motions are moving in opposite directions and by virtue of the turbulence caused by squish referred to above. Organised air movement is thus produced and terminated at the optimum times in the engine cycle.

Although the combustion chamber has been described as formed in the cylinder head it will be appreciated that the head may be substantially plane, though provided with inlet and exhaust ports, and that the combustion chamber may be provided in the crown of the piston.

Obviously, numerous modifications and variations of the present invention are possible in the light of the above teachings. It is therefore to be understood that within the scope of the appended claims the invention may be practiced otherwise than as specifically described herein. Furthermore, the terms and expressions used in the claims should be given their full measure of latitude in meaning (e.g., the expression "radius of curvature" as applied to the arcuate channels should be understood as applying to the changing radii in the progression thereof defining the arcuate shape being considered), and the claims interpreted in accordance with the Doctrine of Equivalents.

What is claimed as new and desired to be secured by Letters Patent of the United States is:

1. A cylinder for a spark-ignited internal combustion engine, said cylinder comprising a piston, a cylinder head, and an inlet port; said cylinder head and said piston having opposed surfaces which together define a combustion chamber; said inlet port comprising means for producing swirl in combustion charges inlet by said port into said combustion chamber during the inlet stroke of said piston; said combustion chamber-defining surfaces having a configuration which divides, reshapes, and guides the swirling combustion charges from said inlet port means into two distinct and separate swirl patterns in response to the compression stroke of said piston; said chamber-defining surfaces establishing each of said two swirl patterns in separate portions of said combustion chamber and imparting to each the same rotational sense; and said chamber-defining surfaces guiding said two separate and distinct swirl patterns into mutually-intersecting interference collision with one another in a predetermined location within said combustion chamber to produce intense turbulence involving substantially all of the inlet charges at said predetermined location.

2. A cylinder as claimed in claim 1 wherein one of said opposing surfaces defines a compound recess which constitutes said combustion chamber, said recess having an outer edge, said outer edge being defined, when viewed in plan, by two arcs, the radius of curvature of each said arc changing along its length and being less at one end than at the other, the decrease in said radius of curvature being in the same sense in said two arcs.

3. A cylinder as claimed in claim 1 wherein said combustion chamber is formed in said cylinder head.

4. A cylinder as claimed in claim 1 wherein said cylinder head has a single inlet port and a single exhaust port.

5. In a spark-ignited internal combustion engine, of the type having a cylinder block defining a cylinder which accommodates a piston and including cylinder head means for closing said cylinder, said cylinder head means and said piston having opposed surfaces, the improvement wherein at least one of said opposing surfaces defines a compound recess comprising a combustion chamber; said recess having a pair of oppositely-disposed outer edges which are at least partially defined, when viewed in plan, by a pair of arcs which intersect one another to form a generally pointed cusp at their intersection, the radius of curvature of each said arc being less at one end than at the other and the decrease in said radius of curvature being in the same sense in said two arcs; said compound recess having a pair of oppositely-disposed arcuate channels, each extending along and adjacent a different one of said two arcs, and each of said arcuate channels progressively increasing in depth in a radially-inward direction with respect to the longitudinal axis of said cylinder over at least one-third to one-half of the length of each of said arc starting at the end at which said radius of curvature is largest; each of said arcuate channels in said pair terminating along an edge comprising an extension of said cusp.

6. The improvement recited in claim 5 wherein the depth of said pair of oppositely-disposed arcuate channels increases progressively in the sense in which said radius of curvature of said arcs decreases, at least over a part of the length of said arcs.

7. The improvement recited in claim 6 wherein the said progressive increase in depth of said arcuate channel occurs over substantially one-third to one-half of the length of each said arc starting at the end at which said radius of curvature is largest.

8. The improvement recited in claim 5 wherein, starting at the ends of said arcs at which said radius of curvature is largest, each said arc has a radius of curvature which is of the same general order of magnitude as the radius of said piston, and the radius of curvature of said arcs thereafter progressively decreasing.

9. The improvement recited in claim 8 wherein that portion of each said arc whose radius of curvature is of the same general order of magnitude as that of said piston is positioned substantially in registry with the wall of said cylinder.

10. The improvement recited in claim 5 wherein each of said channels is defined at least in part by a side wall and a base; wherein said cylinder head engages said cylinder block substantially at a common plane; and wherein said side wall of said channels extends initially away from said common plane on which said cylinder head engages said cylinder block substantially perpendicular to said plane and then merges into said base of said channels, the height of said side wall increasing progressively over at least part of the length of each said channel, and said side wall merging with said base of said channels along a curved-junction surface.

11. The improvement recited in claim 10 wherein the radius of curvature of said curved-junction surface increases progressively along the length of each said channel in the direction in which said radius of curvature of said arc decreases over substantially the last third of the length of said.

12. The improvement recited in claim 5 wherein said combustion chamber is formed in said cylinder head.

13. The improvement recited in claim 5 wherein said cylinder head has an inlet port and an exhaust port, wherein said combustion chamber is formed in said cylinder head, and wherein said base of said combustion chamber has a substantially planar area extending around and between said inlet and exhaust ports.

14. The improvement recited in claim 5 wherein said cylinder head has an inlet port and an exhaust port, and wherein said inlet port is of the type which is arranged so as, in use, to produce swirl of the inlet charge of fuel and air during the inlet stroke of said piston.

15. The improvement recited in claim 5 wherein said arcuate channels progressively increase in width in a radially-inward direction with respect to the longitudinal axis of said cylinder over at least a substantial portion of the arcuate length of said channels.

16. The improvement recited in claim 5, wherein each of said arcuate channels has a terminal portion and is longitudinally curved such that said terminal portions are disposed generally opposite from and facing one another across the central portion of said combustion chamber to thereby guide swirl charges which are carried axially along each such channel to a zone of mutual collision at said central portion of the combustion chamber.

* * * * *